United States Patent [19]
Pfeil et al.

[11] Patent Number: 5,424,340
[45] Date of Patent: Jun. 13, 1995

[54] AQUEOUS EPOXY RESIN DISPERSIONS

[75] Inventors: Armin Pfeil, Weisbaden; Joerg-Peter Geisler, Ingelheim; Paul Oberressl; Dieter Dreischhoff, both of Wiesbaden, all of Germany

[73] Assignee: Hoechst Aktiengesellschaft, Germany

[21] Appl. No.: 216,664

[22] Filed: Mar. 23, 1994

[30] Foreign Application Priority Data

Mar. 25, 1993 [DE] Germany .................. 43 09 639.5

[51] Int. Cl.⁶ .................. C08K 3/20; C08L 63/02
[52] U.S. Cl. .................. 523/403; 428/413
[58] Field of Search .................. 523/403; 428/413

[56] References Cited

U.S. PATENT DOCUMENTS

| | | |
|---|---|---|
| 4,399,242 | 8/1983 | Fowler et al. |
| 4,415,682 | 11/1983 | Becker et al. |
| 4,886,845 | 12/1989 | Becker et al. .................. 523/403 |
| 4,987,163 | 1/1991 | Becker et al. |
| 5,236,974 | 8/1993 | Dreischhoff et al. |

FOREIGN PATENT DOCUMENTS

| | | |
|---|---|---|
| 0081163 | 6/1983 | European Pat. Off. |
| 0272595 | 6/1988 | European Pat. Off. |
| 0346742 | 12/1989 | European Pat. Off. |
| 0491550 | 6/1992 | European Pat. Off. |
| 0530602 | 10/1993 | European Pat. Off. |

OTHER PUBLICATIONS

"Handbook of Epoxy Resins" by Lee & Neville, (1967), pp. 2-25 and 2-26.

Primary Examiner—Melvyn I. Marquis
Assistant Examiner—D. Aylward
Attorney, Agent, or Firm—Bierman and Muserlian

[57] ABSTRACT

Aqueous epoxy resin dispersions containing (A) an epoxy resin which is a condensation product of one or more epoxy compound(s), of an aromatic polyol and, if used, of a modifying compound having at least two groups which are reactive with epoxides, (B) a dispersing agent in the form of a condensation product of an aliphatic polyol and an epoxy compound, the equivalent ratio of the OH groups to the epoxy groups being 1:0.8 to 1:3.5, (C) a carboxyl-containing or -releasing curing agent for the epoxy resin comprising one or more carboxyl-containing compound(s), at least one of these compounds having a functionality of at least three carboxyl groups per molecule, and (D) if desired customary additives, components (A), (B) and (C) being used in such amounts by weight that the equivalent ratio of the epoxy groups of component (A) capable of reacting to the carboxyl groups of component (B) is at least 1:0.5.

6 Claims, No Drawings

AQUEOUS EPOXY RESIN DISPERSIONS

Coating compositions for the interior coating of containers designed for the storage of foodstuffs and beverages have two major functions; on the one hand, they should protect the container material itself against aggressive components of the filling material, for example acids of natural origin, so as to ensure the longest possible service life of the container, and, on the other, they should prevent contamination of the filling material by the container material, for example as a result of chemical reactions. Accordingly, in the ideal case, suitable coatings constitute a chemically inert, impermeable barrier between filling material and container. In order to perform these functions reliably, the coatings have to fulfil a number of requirements. For example, they must exhibit good adhesion to steel, tinplate, aluminum and other current container materials, they must be resistant to dilute acids (for example acetic acid, lactic acid, carbolic acid) and sulfur even at elevated temperatures, they must be stable to pasteurization and sterilization and also exhibit a high degree of elasticity so as to withstand deformations of the container material, either during container production or, for example, caused by denting of the filled container, without damage. Moreover, the coating compositions must not contain any components which migrate into the filling material and modify it in any way. Accordingly, the corresponding coating compositions are subject to restrictive legal regulations, for example in the Federal Republic of Germany by regulations of the Federal Ministry of Health or in the USA by the 21 CFR §175.300 regulation. In order to obtain, in the ideal case, an inert coating film, the coating compositions used are in general one-component systems whose reactive groups react completely at elevated temperatures within a very short period of time, for example at 200° C. within eight to ten minutes, to give a highly crosslinked film.

In the past, suitable binders included epoxy resins of relatively high molecular weight. They are cured under the conditions mentioned in combination with suitable curing agents, for example phenolic resins, amino resins, polycarboxylic acids or anhydrides thereof, produce flexible films which are resistant to chemicals and incidentally are approved for use in interior coatings in foodstuff containers under the laws mentioned. However, in general, such coating composition combinations have a fairly high organic solvent content. As the legal requirements with regard to reduction or complete elimination of solvent emissions—the VOC Regulations of the USA may be mentioned here by way of example—become ever more stringent, the need for low-solvent or solvent-free aqueous coating compositions for interior coating of cans increases. As a matter of fact, a number of proposals in this respect for formulating aqueous binders based on epoxy resin for interior coating of foodstuff containers have already been made: Thus, U.S. Pat. No. 3,862,914 and GB 1,174,344 describe carboxyl-functional reaction products of epoxy resins with acid anhydrides which, after (partial) neutralization with amines, can be transferred to the aqueous phase. These products which are crosslinked by means of phenolic and/or amino resins readily hydrolyze and are therefore not sufficiently stable on storage. To overcome the sensitivity to hydrolysis, epoxy resins can also be reacted with phenolcarboxylic acids which, after ester hydrolysis, can also be partially neutralized and transferred to the aqueous phase. However, these binders are difficult to prepare since the strong bases necessary for the hydrolysis have to be carefully removed.

Other ways of preparing aqueous binders for interior coating of cans are opened up by the modification of epoxy resins with acrylates which can be effected either by the reaction of epoxy groups with (meth)acrylic acid (derivatives), i.e. terminally, or by lateral grafting on the epoxy resin skeleton. In all cases, unsaturated acid monomers, such as, for example, acrylic acid, are also used and then neutralized in order to promote solubility or dispersibility in water. In general, such systems additionally contain up to 25% of organic solvents and have poor resistance to water. German Patent 3,446,178 thus describes a system which contains 40–60% of a high-molecular-weight epoxy resin, 30–40% of phenolic resin and 25–35% of acrylic monomers, one monomer being a carboxylic acid. This system too requires neutralization with amines and a fairly high solvent content. Curing takes place after application in the presence of free-radical initiators, during which addition and polymerization reactions take place simultaneously. This system shows good storage stability and fulfils some of the abovementioned criteria.

There is an amine-neutralized system on the market which comprises a high-molecular-weight, polyacrylic acid-modified epoxy resin which is self-crosslinking or is used in combination with water-dilutable phenolic resins (U.S. Pat. No. 4,458,040). However, this binder too does not have sufficient resistance to sterilization and is therefore not suitable in cans for non-carbonated beverages and foodstuffs which are canned with warming or even heating. In addition, it has further significant disadvantages, such as, for example, the low solids content of about 24%, the high organic solvent content (about 19%) and the volatile amine content (about 2%).

In general, the systems described above, which represent the prior art, are only rarely used for interior coating of cans since the use of volatile amines is problematical not only in terms of toxicology but also in terms of odor, ionically stabilized binders, in general, have insufficient storage stability, and the latter moreover are further restricted by the increase in viscosity as a result of slow reactions of the co-reactants (phenolic resins, melamine resins).

A more reasonable approach to aqueous coating compositions is the use of nonionic emulsifiers or the incorporation of hydrophilic, nonionic groups in the epoxy resin. This (see, for example, EP 272,595) makes it possible to prepare storage-stable, amine-free and low-solvent aqueous dispersions. However, these dispersions and suitable co-reactants, such as phenolic resins and/or melamine resins, whose properties came close to the quality standard known from conventional, solvent-containing systems, have not made it possible until now to prepare coating compositions for cans. For example, no white finishes free from yellowing could be formulated.

However, surprisingly, it has now been found that aqueous, low-solvent, nonionic stabilized dispersions of aqueous epoxy resins, such as described in European Patent 272,595, in combination with specific polyfunctional carboxylic acids and/or derivatives thereof produce combinations of coating compositions which can be heat-cured to give high-quality coatings which fulfil all of the abovementioned criteria and are accordingly highly suitable for interior coating of foodstuff containers, such as, for example, beverage cans.

Accordingly, the invention relates to heat-curable, aqueous, low-solvent epoxy resin dispersions containing the following components (A) an epoxy resin which is a condensation product of
  (A1) 50 to 95, preferably 55 to 85, % by weight of one or more epoxy compound(s) having at least two epoxy groups per molecule and an epoxy equivalent weight of 100 to 2,000,
  (A2) 5 to 50, preferably 15 to 45, % by weight of an aromatic polyol and
  (A3) 0.5 to 25, preferably 0.5 to 10, % by weight of modifying compounds having at least two groups which are reactive with epoxides,
(B) a dispersing agent in the form of a condensation product of an aliphatic polyol having an average molecular weight (Mw) of 200 to 20,000 and an epoxy compound having at least two epoxy groups per molecule and an epoxy equivalent weight of 100 to 2,000, the equivalent ratio of the OH groups to the epoxy groups being 1:0.8 to 1:3.5 and the epoxy equivalent weight of this condensation product being between 5,000 and 400,000 g/mol,
(C) a carboxyl-containing or -releasing curing agent for the epoxy resin (A) comprising one or more carboxyl-containing compound(s), at least one of these compounds having a functionality of at least three carboxyl groups per molecule, and
(D) if desired customary additives, components (A), (B) and (C) being used in such amounts by weight that the equivalent ratio of the epoxy groups capable of reacting to the carboxyl groups is at least 1:0.5.

The invention also provides a process for preparing this heat-curing binder, which comprises first preparing the epoxy resin (A) by condensation of components (A1), (A2) and, if used, (A3) at elevated temperatures in the presence of a condensation catalyst, the condensation reaction being preferably carried out in two steps if two or more epoxy compounds (A1) are used, than adding the dispersing agent (B) and, if used, further organic solvents, and then adding corresponding amounts of water to the mixture thus obtained at 30° to 100° C. and finally adding the curing agents according to (C), and, if used, the substances according to (D), in each case with vigorous stirring and efficient homogenization.

The invention furthermore relates to the use of the binders according to the invention for producing coatings, in particular corrosion-resistant baking primers, fillers and topcoats, preferably on metallic bases, furthermore for producing interior and exterior coatings for crown corks and screw caps and for coil-coating paints coatings which are still subject to substantial deformation after crosslinking, but in particular to the use for interior coatings of beverage cans and preserve cans.

The epoxy resin according to (A) of the dispersions according to the invention preferably has an epoxy equivalent weight of 350 to 4,000, in particular 400 to 2,000. The average particle size of the dispersed resin is usually not greater than 1.0 µm and is preferably 0.2 to 0.8 µm. The content of this resin in the entire dispersion is in general about 20 to 75% by weight, preferably about 25 to 65% by weight.

The 1,2-epoxy compounds according to (A1) and (B) are polyepoxides having on average at least two epoxy groups per molecule. These epoxy compounds can be saturated, unsaturated, aliphatic, cycloaliphatic, aromatic and/or heterocyclic and can also contain hydroxyl groups. Furthermore, they can contain those substituents and/or functional groups which do not cause any interfering secondary reactions under the mixing or reaction conditions, for example alkyl or aryl substituents, ether groups and the like.

These epoxy compounds are preferably polyglycidyl ethers based on polyhydric, preferably dihydric alcohols, phenols, hydrogenation products of these phenols and/or of novolaks (reaction products of mono- or polyhydric phenols with aldehydes, in particular formaldehyde in the presence of acid catalysts). The epoxy equivalent weights of these epoxy compounds are preferably between 100 and 2,000, in particular between 100 and 350.

Examples of polyhydric phenols include: resorcino, hydroquinone, 2,2-bis(4'-hydroxyphenyl)propane (bisphenol A), isomeric mixtures of dihydroxydiphenylmethane (bisphenol F), tetrabromobisphenol A, 4,4'-dihydroxydiphenylcyclohexane, 4,4'-dihydroxy-3,3'-dimethyldiphenylpropane, 4,4'-dihydroxybiphenyl, 4,4'dihydroxybenzophenone, 1,1-bis-(4'-hydroxyphenyl)ethane, 2,2-bis[4'-(2''-hydroxypropoxy)phenyl]propane, 1,1-bis(4'-hydroxyphenyl)isobutane, 2,2-bis(4'-hydroxy-tert.-butylphenyl)-propane, bis(2-hydroxynaphthyl)-methane, 1,5-dihydroxynaphthalene, tris-(4-hydroxyphenyl)-methane, bis(4-hydroxyphenyl) ether, bis(4-hydroxyphenyl) sulfone, and the like, and the halogenation and hydrogenation products of the abovementioned compounds. Of these, bisphenol A is particularly preferred.

Examples of polyhydric alcohols include ethylene glycol, diethylene glycol, triethylene glycol, polyethylene glycols (n=1 to 35), 1,2-propylene glycol, polypropylene glycols (n=1 to 15), 1,3-propylene glycol, 1,4-butanediol, 1,5-pentanediol, 1,6-hexanediol, 1,2,6-hexanetriol, glycerol, neopentylglycol, 1,4-dimethylolcyclohexane, trimethylolethane, trimethylolpropane, and ethoxylated and propoxylated bisphenols, such as, for example, propoxylate bisphenol A. Of these, polypropylene glycols (n=8-10) are particularly preferred.

It is also possible to use polyglycidyl esters of polycarboxylic acids which are obtained by the reaction of epichlorohydrin or similar epoxy compounds with an aliphatic, cycloaliphatic or aromatic polycarboxylic acid, such as oxalic acid, succinic acid, adipic acid, glutaric acid, phthalic acid, terephthalic acid, hexahydrophthalic acid, 2,6-naphthalenedicarboxylic acid and dimerized linolenic acid. Examples are diglycidyl adipate, diglycidyl phthalate and diglycidylhexahydrophthalate.

A detailed list of suitable epoxy compounds can be found in the handbook "Epoxidverbindungen und Epoxidharze" by A. M. Paquin, Springer Verlag, Berlin 1958, Chapter IV und in Lee, Neville, "Handbook of Epoxy Resins", McGraw-Hill Book Co., 1967, Chapter 2. The epoxy compounds mentioned can be used individually or in a mixture.

Suitable aromatic polyols according to (A2) are preferably the aromatic OH-containing compounds described above under components (A1), i.e. polyhydric, preferably dihydric, phenols, halogenation products thereof and/or novolaks. Here, too, particular preference is given to bisphenol A.

The modifying compounds according to (A3) are compounds having at least two functional groups capable of reacting with the epoxy groups of component (A1) and not classifiable under the aromatic polyols according to (A2). They are used in order to give the base resin (A) desirable properties by selective modification. These can be polyamines (for example ethylenediamine, diethylenetriamine, triethylenetetramine, tetraethylenepentamine, and the like), polyoxyalkylene oxide having terminal amino groups (for example the Jeffamines ® from TEXACO), polycarboxylic acids (for example maleic acid, fumaric acid, phthalic acid, succinic acid, dimeric and trimeric fatty acids, and the like, and anhydrides thereof, if possible, see also the acids in the description of the carboxyl-containing curing agents according to (C)) and aliphatic polyols (for example ethylene glycol, propylene glycol, butylene glycol, polyethylene glycol, polypropylene glycol, trimethylolpropane and -ethane, neopentylglycol, glycerol, and the like). Particular preference is given to dimeric fatty acids containing 20 to 50 carbon atoms.

The aliphatic polyols of component (B) are preferably polyether polyols (polyalkylene glycols) with average molecular weights (MW; gel permeation chromatography; polystyrene standard) of preferably between 600 and 12,000, in particular 2,000 to 8,000, and OH numbers of, advantageously, 10 to 600, preferably 15 to 120. These polyether polyols preferably have only terminal, primary OH groups. Examples of these include block copolymers of ethylene oxide and propylene oxide and polyethylene glycols, polypropylene glycols, polybutylene glycols, it also being possible to use mixtures of the particular polyalkylene glycols. Preferably, polyethylene glycols are used.

Dispersing agent (B) is preferably prepared by condensation of the polyether polyols mentioned with the polyglycidyl ethers according to (A1) in the presence of suitable catalysts at 50° to 200° C., preferably at 90 to 170° C. the equivalent ratio of the OH groups to the epoxy groups being 1:0.8 to 1:1.5, preferably 1:0.95 to 1:1.25, and the epoxy equivalent weight of the condensation product being at least 5,000 g/mol, preferably 100,000 g/mol to 400,000 g/mol.

Suitable catalysts for preparing the dispersing agent (B) are strong inorganic and organic bases, such as, for example, sodium hydroxide, potassium hydroxide, lithium hydroxide, barium hydroxide, strontium hydroxide, alkali metal alkoxides, such as sodium methoxide, lithium methoxide, sodium ethoxide and potassium dodecyloxide, and alkali metal salts of carboxylic acids, such as, for example, sodiumstearate and lithiumstearate. Strong inorganic and organic protonic acids, for example phosphoric acid, sulfuric acid, tetrafluoroboric acid and benzenesulfonic acid, are also suitable. Furthermore, Lewis acids can also be used as catalysts. Examples include tin(IV) chloride, titanium(IV) chloride, titanium(IV) isopropoxide, triethyloxonium tetrafluoroborate and boron trifluoride and its complexes, for example with phosphoric acid, acetic acid (1:1 and 1:2 ), methanol, diethyl ether, tetrahydrofuran, phenol, ethylene glycol monoethyl ether, polyethylene glycol, (MW 200), dimethylsulfoxide, di-n-butyl ether, di-n-hexyl ether, succinic acid and aliphatic, cycloaliphatic, araliphatic amines and nitrogen heterocycles.

Catalysts which are preferably used are BF$_3$/diethyl ether, BF$_3$/acetic acid and aqueous tetrafluoroboric acid. The amount of catalyst is in general 0.1 to 5, preferably 0.1 to 1, % by weight, relative to the reaction mixture. For improved metered addition, the catalyst can be diluted in a solvent, such as diethyl ether, a glycol ether or cyclic ether, ketones and the like.

To prepare the dispersing agent, the mixtures of hydroxyl- and epoxy-containing compounds to be reacted are heated to the temperature at which condensation proceeds at a sufficiently high rate, i.e. within 30 minutes to 5 hours. The reaction is advantageously monitored by the increase in the epoxy equivalent weight which indicates a reduction in the epoxy group content. The reaction can be stopped by cooling below the reaction temperature.

The condensation product thus obtained can be used as such (100% strength) as dispersing agent (B) for preparing the dispersions according to the invention. However, for reasons of better handling, it is preferred to prepare a mixture of 20 to 99, preferably 40 to 60, % by weight of the condensation product and an aqueous medium comprising (relative to the entire mixture) up to 50, preferably up 30, % by weight of an organic solvent and up to 80, preferably 15 to 60, % by weight of water and to use this mixture as dispersing agent (B). Suitable organic solvents are in particular glycols, mono- and diether and mono- and diesters of glycols with alcohols and acids, aliphatic alcohols having branched or unbranched alkyl radicals of 1 to 12 carbon atoms, cycloaliphatic and araliphatic alcohols and esters and ketones, it being possible for these solvents to be used individually or in a mixture. Examples include ethylene glycol, ethylene glycol monomethyl ether, ethylene glycol dimethyl ether, butyl glycol, methoxypropanol, ethoxypropanol, ethanol, 1- and 2-propanol, butanol, cyclohexanol, benzyl alcohol, ethyl acetate, acetone and methyl isobutyl ketone. Preferably, butyl glycol, methoxypropanol, ethoxypropanol, 2-propanol and/or benzyl alcohol are used.

The epoxy resin dispersions according to the invention in general contain 3 to 20, preferably 4 to 5, % by weight of the dispersing agent (B).

It is also possible to add further solvents to the dispersion comprising epoxy resin and dispersing agent. Suitable organic solvents are, accordingly, in this case too the abovementioned solvents, it also being possible to use aromatics, such as toluene or xylene. The solvents can be used individually or in a mixture. Preferred solvents are again butyl glycol, methoxypropanol, methoxybutanol, isopropoxypropanol, ethoxypropanol, 2-propanol and/or benzyl alcohol.

The total organic solvent content in the ready-to-use dispersion is up to 10% by weight, relative to the ready-to-use dispersion, preferably less than 6% by weight.

Suitable carboxyl-containing curing agents (C), which are generally used in an equivalent ratio of epoxy equivalent to carboxyl equivalent of at least 1:0.5, are water-soluble or water-miscible polycarboxylic acids. Examples of such polycarboxylic acids are cyclopentanetetracarboxylic acid, cyclobutanetetracarboxylic acid, 1,2,3,4-butanetetracarboxylic acid, tartaric acid, malonic acid, malic acid, citric acid, aconitic acid, and the like.

Further suitable polycarboxylic acid curing agents are anhydrides or partial esters of these acids with polyhydric alcohols having 2 to 12, preferably 2 to 6, carbon atoms, such as, for example, neopentyl glycol, glycerol, trimethylolethane or -propane, alkanediols and oligomers thereof which may contain one or more ether bridges such as ethylene glycol, propane- and butanediols, the esters always having at least two free carboxyl groups. It is also possible to use, as the polycarboxylic acid curing agents, partial esters of carboxylic acids containing two or more carboxyl groups, such as, for example, pyromellitic acid, trimellitic acid, phthalic acid, endomethylenetetra- or -hexahydrophthalic acid, maleic acid, fumaric acid, or anhydrides thereof, if they exist, with polyhydric alcohols, for example the abovementioned ones, if these partial esters are sufficiently water-soluble or water-dilutable. Suitable hydrophilic partial polyesters, for example of the polybasic acids with the polyhydric alcohols mentioned, can also be used. Reaction products of these acid anhydrides or acids with polyamino-functional compounds, such as, for example, polyamines, such as diethylenediamine, diethylenetriamine, triethylenetetramine and higher homologs, or with a wide range of polyoxyalkylenediamines (Jeffamine ® from Texaco), and hydroxycarboxylic acids modified on the hydroxyl groups, such as, for example, alkoxylated citric acid or tartaric acid, and the like, and any acids capable of transesterification under the curing conditions, such as, for example, the methyl esters of trimellitic acid or malic acid, can also be used as curing agents. Partial salts of the acids mentioned, preferably those with volatile bases, and further derivatives releasing reactive carboxyl groups under the curing conditions are also suitable. Preferably, polycarboxylic acids are used as acidic curing agents.

Curing of the epoxy resin dispersions by means of the acidic curing agents is advantageously carried out at elevated temperatures, for example at 60° to 250° C., preferably at 80° to 200° C., over a period of one to 150 minutes. To obtain more complete curing or to lower the temperatures necessary for sufficient curing, further small amounts of compounds catalyzing the reaction of carboxyl groups/epoxy groups can be added to the acidic curing agents mentioned. Examples of suitable compounds are strong protonic acids, such as phosphoric acid or para-toluene sulfonic acid, tertiary amines, such as triethylamine, N,N-dimethylbenzylamine, nitrogen heterocycles, such as imidazole, pyridine and derivatives thereof, trialkyl- and triarylphosphines and the corresponding phosphonic compounds and metal salts or metal chelates, such as, for example, tin-(II) octanoate.

In addition to the curing agents described above, amino resins and/or phenolic resins, which are used in amounts of 5 to 50% by weight, preferably 10 to 35% by weight, relative to the total solids content of the ready-to-use dispersion, can also be applied for curing. If desired, the dispersion is brought to a total solids content of 10 to 80% by weight by additional water. Examples of such amino resins are amine/aldehyde resins, i.e. condensation products of aldehydes with melamine (melamine resins), urea (urea resins), acetoguanamine (acetoguanamine resins) or similar compounds or suitable precondensation products. Preferred aldehyde condensation products of melamine are in particular melamine alkoxyalkyl ethers, the alkyl radicals being methyl, n- or i-butyl groups, preferably methyl groups, such as hexamethoxymethylmelamine, ethoxymethoxymethylmelamine, monomethylolpentamethoxymethylmelamine, dimethyloltetramethoxymethylenemelamine, trimethyloltrimethoxymethylenemelamine and the like of substantially monomeric structure, and the corresponding oligomeric or polymeric products.

Phenolic resin curing agents include resols, formaldehyde/phenolcarboxylic acid resins and phenolic resin precursors, preference being given to the commercially available etherified, water-dilutable phenolic resin resols.

If preferred, acid catalysts, such as para-toluenesulfonic acid, cyclohexanesulfamic acid, butyl hydrogen phosphate and phosphoric acid—if desired also as (amine) salts—can also be added to the dispersions containing phenolic resin and/or amino resin so as to accelerate the rate of the curing reaction, thus producing films or coatings which are cured at low temperature or within a shorter period of time. The amount of these acid catalysts is, for example, 2% by weight, relative to the total solids content.

The dispersions according to the invention can also contain, in addition to binder (A) +(B) +(C), other curable binders. Examples of such additional binders are resins which are dispersible in aqueous media and are based on hydroxyalkyl acrylates, hydroxyalkyds, polyesters, epoxy resins, and the like. The amount of these additives can be such that their proportion of the total solids content is about 10 to 80, preferably 20 to 40, % by weight. The properties of the products prepared from the dispersions can be influenced by the addition of such resins in various ways. Thus, for example, the addition of acrylate resins can result in an increase in the resistance to yellowing, while the presence of alkyd resins significantly improves the elasticity of the coatings produced therefrom.

The total solids content of the epoxy resin dispersions according to the invention can be between 10 and 80% by weight, is advantageously between 35 and 70% by weight, and is preferably between 45 and 65% by weight.

The viscosity of these dispersions is in general between 200 and 30,000 mPa.s, preferably between 750 and 7,000 mPa.s.

Examples of customary additives according to (D) which may possibly be present in the dispersions according to the invention are the customary paint additives, such as pigments, pigment pastes, antioxidants, flow-improving and thickening agents, antifoamers/deaerators and/or wetting agents, reactive thinners, fillers, catalysts, preservatives, protective colloids and the like. These additives if desired, just like the curing agents, can be added to the dispersion just before processing.

To prepare the epoxy resin dispersions according to the invention, first the epoxy resin (A) is prepared by condensation of components (A1) and (A2), if desired in conjunction with (A3), at elevated temperatures, in general at 100° to 220° C., preferably at 150° to 180° C. in the presence of a condensation-accelerating catalyst.

If two or more epoxy compounds (A1) are used, the condensation reaction is preferably carried out in two steps, in which in a first reaction one or more components (A1) are reacted with the components according to (A2) and, if used, (A3) in such relative amounts that this first condensation product has an epoxy equivalent weight of greater than 5,000 g/mol, preferably greater than 20,000 g/mol, and still contains free phenolic groups, and in a further condensation reaction this first condensation product is reacted with further epoxy compounds according to (A1) finally to give the desired epoxy resin (A).

Examples of suitable condensation catalysts are phosphines, such as triphenylphosphine, phosphonium salts, such as, for example, benzyltrimethylphosphonium chloride, tertiary amines, such as N,N-dimethylbenzylamine, quaternary ammonium salts, such as, for example, tetramethylammonium chloride, alkali metal hydroxides, such as sodium hydroxide and lithium hydroxide, alkali metal carbonates, such as sodium carbonate and lithium carbonate, alkali metal salts of organic acids, such as, for example, sodium formate, lithium benzoate and lithium stearate, and Lewis acids, such as, for example, boron trifluoride and its complexes, titanium tetrachloride, tin chloride and triethyloxonium tetrafluoroborate.

This is followed by adding the dispersing agent (B) and, if used, organic solvents to the epoxy resin (A) at temperatures of 60° to 200° C., preferably 70° to 120° C., and stirring the mixture for 15 to 80, preferably 30 to 90, minutes.

The corresponding amount of water is then metered in, preferably in several portions, at temperatures of 30 to 100° C., preferably 50° to 90° C., with vigorous stirring to give the aqueous dispersion. If desired, suitable antifoamer/deaerator additives can be added in this step.

The dispersion of the epoxy resin (A) in water is advantageously carried out with the aid of suitable dispersing apparatuses, for example of a high-speed blade stirrer, a multi-stage impulse helical ribbon stirrer, a colloid mill, a homogenizer, a dissolver or another high-speed mixer displaying a high shearing force.

This is followed by addition of the curing agent (C) with vigorous stirring, here too efficient homogenization being achieved by extensive stirring for 5 to preferably 30 to 90, minutes. If desired, customary additives, pigments, fillers and/or further curing resins can be added to the heat-curing one-component binder thus obtained with efficient homogenization.

The curing agents can be added to the epoxy resin dispersions directly after their preparation or else shortly before application all at once or in portions. The substances according to (C) are preferably added immediately after preparation of the epoxy resin dispersion with efficient homogenization.

Compared with the known aqueous coating compositions for interior coating of foodstuff containers of any type, the coating compositions according to the invention are distinguished by excellent storage stability, absence of amines and low solvent content or absence of solvent. Furthermore, as nonionically stabilized systems, they are, for the most part, insensitive to variations in the pH and influences caused by water hardness, possess, despite low viscosity, a high solids content, compared with ionically stabilized binders, and have good pigment-ability.

The binders or aqueous varnishes obtained according to the invention can be applied to a wide range of, preferably metallic, substrates in a thin film by customary methods (by dip-, roller-, spray-, brush-coating and the like) and can advantageously be baked at temperatures of 60° to 300° C. preferably 80° to 250° C., within one to 150 minutes.

The coatings obtained with the coating compositions according to the invention show a high degree of crosslinking, are resistant to chemicals, sterilization and pasteurization and are resistant to water. When subjected to baking, they show little or no yellowing at all, good flow properties and gloss and exhibit excellent adhesion to a wide range of bases, even when subjected to mechanical stress, such as, for example, during deep-drawing.

The examples which follow describe the preparation of the epoxy resin (A), of the dispersing agent (B), of the dispersion and of the heat-curing binder, and its application.

EXAMPLES

I. Epoxy resins (A)

1) 144 g of a polypropylene glycol/diglycidyl ether having an epoxy equivalent weight of about 340 g/mol and 231 g of bisphenol A were heated in a 1l four-neck flask equipped with a thermometer, blade stirrer, reflux condenser and dropping funnel to 130° C. under an inert gas atmosphere with stirring. After addition of 300 mg of catalyst 1201 from Shell Chemie (quarternary phosphonium iodide), the mixture was further heated to 160° C. and maintained at this temperature until the epoxy equivalent weight of the reaction product was more than 10,000 g/mol. It was then cooled to 120° C., and 525 g of a diglycidyl ether of bisphenol A having an epoxy equivalent weight of 183 g/mol were added at this temperature. After addition of a further 300 mg of the abovementioned catalyst, the mixture was heated to 160° C. and maintained at this temperature until the product had an epoxy equivalent weight of 729 g/mol.

2) The procedure of Example I.1) was repeated, except that the starting materials were used together and reacted with 600 mg of the catalyst in one step.

3) As described in Example I.2), 26 g of a modified epoxy resin (diglycidyl ether of propoxylated bisphenol A, DOW experimental resin XU 7189100) having an epoxy equivalent weight of 345 were reacted with 73 g of a polypropylene glycol/diglycidyl ether having an epoxy equivalent weight of about 340 g/mol and 239 g of bisphenol A to give a product having an epoxy equivalent weight of 725 g/mol.

4) As described in Example I.2), 26 g of the diglycidyl ether of cyclohexanedimethanol (Epodil 757 from Anchor) having an epoxy equivalent weight of 160 were reacted with 75 g of a polypropylene glycol/diglycidyl ether having an epoxy equivalent weight of about 340 g/mol, 235 g of a diglycidyl ether of bisphenol A having an epoxy equivalent weight of 183 g/mol and 117 g of bisphenol A to give a product having an epoxy equivalent weight of 720 g/mol.

5) As described in Example I.2), 69.5 g of resorcinol were reacted with 72 g of a polypropylene glycol/diglycidyl ether having an epoxy equivalent weight of about 340 g/mol and 308.5 g of a diglycidyl ether of bisphenol A having an epoxy equivalent weight of 183 g/mol to give a product having an epoxy equivalent weight of 703 g/mol.

6) As described in Example I.2), 27 g of resorcinol and 56 g of bisphenol A were reacted with 102 g of a polypropylene glycol/diglycidyl ether having an epoxy equivalent weight of about 340 g/mol and 240 g of a diglycidyl ether of bisphenol A having an epoxy equivalent weight of 183 g/mol to give a product having an epoxy equivalent weight of 772 g/mol.

7) As described in Example I.2), 93.5 g of bisphenol A were reacted with 58 g of a polypropylene glycol/diglycidyl ether having an epoxy equivalent weight of about 340 g/mol and 212 g of a diglycidyl ether of bisphenol A having an epoxy equivalent weight of 183 g/mol to give a product having an epoxy equivalent weight of 733 g/mol.

8) A mixture of 103.4 g of polypropylene glycol/diglycidyl ether having an epoxy equivalent weight of from about 340 g/mol, 223 g of diglycidyl ether of bisphenol A having an epoxy equivalent weight of 183 g/mol, 93.5 g of bisphenol A and 30.2 g of a dimeric fatty acid having an average molecular weight of 567 g/mol (Pripol 1009 from UNICHEMA) is heated to 150° C. and maintained, after addition of 0.7 g of Shell catalyst 1201, at 160° C. until a constant EV value of 745 g/mol is reached.

II. Dispersing agent (B)

1) 309 g of technical grade polyethylene glycol having an average molecular weight (MW) of 4,000 g/mol and 34.1 g of a polyglycidyl ether based on bisphenol A temperature after the previous condensation reaction is complete and thoroughly stirred together with 90 g of a solvent. 201 g (for 10%) to 302 g (for 15%) of the dispersing agent according to Example II. are then added, and the mixture is vigorously stirred for about 1.5 hours, the temperature dropping to 85° C. in the process. 120 g of deionized water are evenly metered in at a stirring rate of 600 rpm over a period of 15 minutes, followed by one hour of stirring with a lowering of the temperature to 70° C. The resulting aqueous dispersion is then diluted with 400 to 500 g of deionized water.

| No. | Resin | Emulsifier % by weight rel. to resin | Solvent % by weight, rel. to resin | EV value g/mol rel. to 100% | nv % | Visc. mPas, 25° C. | Ps nm, mono-modal |
|---|---|---|---|---|---|---|---|
| III.1 | I.1 | 10% of II.3 | 10% of methoxybutanol | 805 | 55.1 | 1040 | 589 |
| III.2 | I.2 | 10% of II.3 | 9% of methoxybutanol | 800 | 57.4 | 2100 | 677 |
| III.3 | I.3 | 10% of II.3 | 5% of methoxypropanol | 825 | 56.1 | 1600 | 512 |
| III.4 | I.4 | 10% of II.2 | 6% of ethoxypropanol | 800 | 55.4 | 4500 | 435 |
| III.5 | I.5 | 10% of II.2 | 9% of ethoxypropanol | 865 | 55.1 | 2280 | 472 |
| III.6 | I.6 | 15% of II.3 | 10% of methoxypropanol | 913 | 58.2 | 7250 | 627 |
| III.7 | I.7 | 15% of II.3 | 10% of methoxypropanol | 878 | 59.0 | 4150 | 1417 |
| III.8 | I.8 | 15% of II.3 | 10% of methoxypropanol | 935 | 56.8 | 5100 | 873 |
| III.9 | I.7 | 15% of II.4 | 10% of methoxypropanol | 877 | 57.0 | 2400 | 765 | nv: non-volatiles (1 g 1 h at 125° C. in an air-circulation oven, DIN)
visc: Viscosity by the method of Ubbelohde
PS: particle size having an epoxy equivalent weight of 183 g/mol were heated together to 100° C., and 0.35 ml of 50% strength aqueous tetrafluoroboric acid was added with stirring. The equivalent ratio of OH groups to epoxy groups was 1:1.20. The mixture was further heated to 130° C. and maintained at this temperature until the epoxy equivalent weight of the condensation product was about 350,000 g/mol. After cooling, the emulsifier had a brittle, wax-like solid consistency.

2) 155 g of technical grade polyethylene glycol having an average molecular weight (MW) of 2,000 g/mol and 34.1 g of a polyglycidyl ether based on bisphenol A having an epoxy equivalent weight of 183 g/mol were heated together to 100° C., and 0.35 ml of 50% strength aqueous tetrafluoroboric acid was added with stirring. The equivalent ratio of OH groups to epoxy groups was 1:1.20. The mixture was further heated to 130° C. and maintained at this temperature until the epoxy equivalent weight of the condensation product was about 350,000 g/mol. After cooling, the emulsifier had a wax-like solid consistency.

3) 250 g of the condensation product prepared according to Example II.1) were dissolved in 250 g of water with stirring and slight heating to about 80° C. The light yellow, clear emulsifier solution obtained had a viscosity (measured by the method of Ubbelohde, 25° C.) of 3,500 mPa.s and a solids content of 50%.

4) 150 g of the condensation product prepared according to Example II.1) were dissolved together with 100 g of the condensation product prepared according to Example II.2) in 250 g of water with stirring and slight heating to about 70° C. The yellowish, clear emulsifier solution obtained had a viscosity (measured by the method of Ubbelohde, 25° C.) of 1,800 mPa.s and a solids content of 50%.

III. Dispersion free of curing agent

General procedure:

900 g of an epoxy resin according to Example I. are heated under nitrogen in a 2 l four-neck flask equipped with thermometer, blade stirrer, reflux condenser and dropping funnel to 100 to 120° C. or cooled to this IV. Preparation of the dispersion according to the invention General procedure for formulating the binder according to the invention:

A solution or dispersion of at least 0.5 mol of the curing agent component according to (C) in the required amount of water per mol of epoxy groups is slowly added to the epoxy resin dispersion with thorough stirring. After efficient homogenization, 0.5% by weight of phosphoric acid (as 50% strength aqueous solution) is stirred in. The heat-curing one-component coating composition thus prepared usually has a solids content of about 50 to 60%. It can be used directly in this form as an aqueous clear varnish and was tested in this form without any further additives by the standard methods for interior coatings of cans as described in V. If desired, this could be followed by adding various additives, i.e. additives according to (D) for defoaming, wetting, flow improvement, pigmenting, and the like, followed by homogenization of the mixture.

V. Properties in practical application

Tinplate and/or aluminum sheets are coated with thin films using a 25 μm knife, and the films are baked at 200° C. for 12 minutes. The baked film has a dry film thickness of about 5 μm.

All clear coats obtained from epoxy resin dispersions according to Examples III.1 to III.9 and using various curing agents (C) for the general procedure in IV. form highly crosslinked and deep-drawable films of high gloss and good adhesion with excellent flow properties. In all cases the resistance to sterilization and the resistance to sulfur are good to very good. Thus, the novel binders described according to the invention are suitable, without any restriction, not only for use in beverage cans but also for foodstuff cans.

VI. Migration tests

For use of the dispersions according to the invention, a plurality of typical representatives were applied to Sn or Ag foils under the conditions mentioned in V., and the baked films were extracted with water, 3% of acetic acid and 15% of ethanol at 121° C. for 30 minutes, and with n-heptane at 65° C. for 2 hours (2 dm² of surface area in contact with 400 cm³ of simulation solvent). The global migration values (in mg/dm²) were determined by evaporation of the solvent and gravimetric determination of the residue, and the values found are clearly below the allowable concentrations of the FDA (7.8 mg/dm²) and of the BGA (German Federal Health Department) (5.0 mg/dm²), i.e. on average about 2-3 mg/dm². Conventional interior coatings of preserve cans based on epoxy resin or epoxy/phenolic resin are also in this range. Thus, the dispersions according to the invention fulfil the requirements of interior coatings of preserve cans with respect to global migration. Aqueous systems which correspond to the prior art and are also used would not pass the test under the abovementioned conditions, i.e. they are not resistant to sterilization.

We claim:

1. An aqueous epoxy resin dispersion containing
   (A) an epoxy resin which is a condensation product of
      (A1) 50 to 95% by weight of one or more epoxy compound(s) having at least two epoxy groups per molecule and an epoxy equivalent weight of 100 to 2,000,
      (A2) 5 to 50% by weight of an aromatic polyol and
      (A3) 0.5 to 25% by weight of modifying compound having at least two groups which are reactive with epoxides,
   (B) a dispersing agent in the form of a condensation product of an aliphatic polyol having an average molecular weight (MW) of 200 to 20,000 and an epoxy compound having at least two epoxy groups per molecule and an epoxy equivalent weight of 100 to 2,000, the equivalent ration of the OH groups to the epoxy groups being 1:0.8 to 1:3.5 and the epoxy equivalent weight of this condensation product being between 5,000 and 400,000 g/mol,
   (C) a carboxyl-containing or -releasing curing agent for the epoxy resin (A) comprising one or more carboxyl-containing compound(s), at least one of these compounds having a functionality of at least three carboxyl groups per molecule, and
   (D) optionally additives selected from the group consisting of pigments, pigment pastes, antioxidants, flow-improving and thickening agents, antifoamers, deaerators, wetting agents, reactive thinners, fillers, catalysts, preservatives, and protective colloids, components (A), (B) and (C) being used in such amounts by weight that the equivalent ratio of the epoxy groups of component (A) capable of reacting to the carboxyl groups of component (B) is at least 1:0.5.

2. A coating composition containing an aqueous epoxy resin dispersion of claim 1.

3. A beverage can or a preservative can provided with an interior coating of a composition containing an aqueous epoxy resin dispersion of claim 1.

4. A resin dispersion of claim 1 containing 55 to 85% by weight of component $A_1$.

5. A resin dispersion of claim 1 containing 15 to 45% by weight of component $A_2$.

6. A resin dispersion of claim 1 containing 0.5 to 10% oby weight of component $A_3$.

* * * * *